US005749052A

United States Patent [19]
Hidem et al.

[11] Patent Number: 5,749,052
[45] Date of Patent: May 5, 1998

[54] CELLULAR TELEPHONE MANAGEMENT SYSTEM

[75] Inventors: Stephen E. Hidem; Joseph P. Tretter, III, both of Minneapolis, Minn.; John Schuholz, Cincinnati, Ohio; Robert P. Engfer, Minnetonka, Minn.; Charles H. Smoot, III, Orono, Minn.; Hans Anderson, Bloomington, Minn.

[73] Assignee: Tele Digital Development, Inc., St. Paul, Minn.

[21] Appl. No.: 449,849

[22] Filed: May 24, 1995

[51] Int. Cl.⁶ .......................... H04M 11/00; H04Q 7/00
[52] U.S. Cl. .......................... 455/406; 455/422; 455/565
[58] Field of Search .................. 379/59, 60, 58; 455/33.1, 406, 422, 565

[56] References Cited

U.S. PATENT DOCUMENTS

| | | | |
|---|---|---|---|
| 4,677,654 | 6/1987 | Lagin et al. | 379/58 |
| 4,839,829 | 6/1989 | Freedman | 364/519 |
| 4,951,308 | 8/1990 | Bishop et al. | 379/91 |
| 5,046,188 | 9/1991 | Molnar | 379/94 |
| 5,127,041 | 6/1992 | O'Sullivan | 379/59 |
| 5,136,229 | 8/1992 | Galvin | 320/2 |
| 5,138,650 | 8/1992 | Stahl et al. | 379/61 |
| 5,144,649 | 9/1992 | Zicker et al. | 379/59 |
| 5,248,927 | 9/1993 | Takei et al. | 320/2 |
| 5,253,300 | 10/1993 | Knapp | 381/68.6 |
| 5,272,747 | 12/1993 | Meads | 379/59 |
| 5,291,543 | 3/1994 | Freese et al. | 379/60 X |
| 5,301,234 | 4/1994 | Mazziotto et al. | 379/59 X |
| 5,345,595 | 9/1994 | Johnson et al. | 455/33.1 |
| 5,361,297 | 11/1994 | Ortiz et al. | 379/59 X |
| 5,388,148 | 2/1995 | Seiderman | 379/59 |
| 5,411,816 | 5/1995 | Patino | 429/7 |
| 5,425,083 | 6/1995 | Furuya et al. | 379/59 X |
| 5,473,671 | 12/1995 | Partridge, III | 379/58 X |
| 5,487,108 | 1/1996 | Atkins et al. | 379/58 X |
| 5,577,100 | 11/1996 | McGregor et al. | 455/33.1 X |
| 5,583,917 | 12/1996 | Jonnson | 379/60 |

*Primary Examiner*—Allen R. Macdonald
*Assistant Examiner*—Scott Richardson
*Attorney, Agent, or Firm*—Westman, Champlin & Kelly, P.A.

[57] ABSTRACT

A cellular telephone includes a receiver for receiving cellular communications and a transmitter for transmitting cellular communications. A controller is coupled to the receiver and the transmitter and controls the receiver and the transmitter based on the command signals. The controller includes a first memory for storing call rate information indicative of rates charged for the cellular communications. A timer provides a timer signal indicative of a time during which the cellular communications take place. The controller determines the amount of currency to be charged for the cellular communications based on the call rate information and the timer signal. An administrator station is provided for loading a threshold amount of currency into the cellular telephone. The entire system can be tracked and managed, and system wide statistics are available to the system operator.

7 Claims, 16 Drawing Sheets

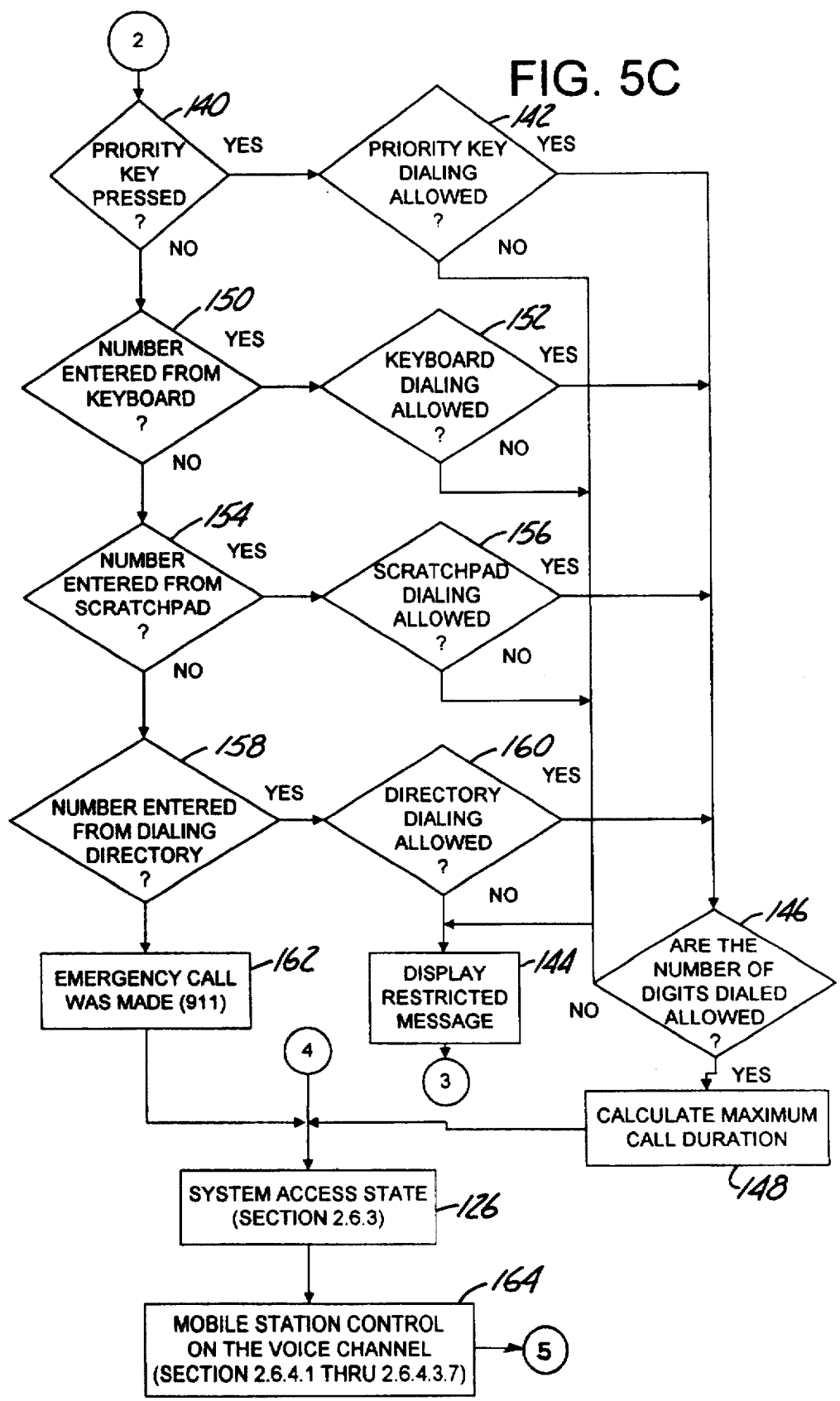

FIG. 7D

*Tallis System Groups*
Directory

Create/Modify Dialing Directories

Dialing Directory Name: National

| Entry# | Display Tag | Phone | Description |
|---|---|---|---|
| 3 | TAXI | 222-0000 | Airport Taxi |
| 4 | TICKETS | 989-5151 | Ticket Master |
| 5 | R CHINESE | 338-3499 | Leanne Chin mpls downtown |
| 6 | R SPORTS | 336-5050 | Champs mpls downtown |
| 7 | R JAPAN | 292-0444 | soreygua Grand Ave St Paul |
| 8 | R STEAK | 339-0909 | Murrays mpls downtown |
| 9 | R ITALIAN | 831-4044 | olive garden Bloomington |
| 10 | R MEXICAN | 822-2104 | Pepitos S mpls |

Save
Delete
Cancel
Close
Help

CELLULAR TELEPHONE MANAGEMENT SYSTEM

BACKGROUND OF THE INVENTION

The present invention relates to a cellular telephone system. More particularly, the present invention relates to a cellular telephone management system for managing the operation and control of a cellular telephone.

Cellular telephones have become increasingly popular over the last several years. Cellular telephones of the mobile variety are often found in automobiles, trucks and other vehicles. Portable cellular telephones are typically carried by the user in a pocket or a small carrying bag.

Cellular telephones are used in a cellular communications network which, in general, communicates with radio frequency (RF) signals. The cellular network is broken up into a plurality of cells each of which is provided with a radio frequency transceiver for receiving and transmitting RF signals. A number of cells are arranged around a Mobile Telephone Switching Office (an MTSO) which controls the cellular communications among its corresponding cells, and which also interfaces with other MSTO, as well as Public Switched Telephone Networks. The Public Switched Telephone Networks (PSTNs) control communications on wire line telephones.

Due to the mobile nature of cellular telephones, calls are commonly placed by a single cellular telephone from a variety of different cells, and from a variety of different local cellular networks. In fact, a single cellular telephone communication initiated from, for example, an automobile may take place as the automobile crosses boundaries between several cells. In addition, the same cellular telephone may be transported to a completely different local cellular network (e.g., from Minneapolis to Chicago) and be used to initiate a call to another cellular network. To date, this type of mobility has made call tracking and billing extremely cumbersome.

Billing information regarding the number of calls made by a particular cellular telephone must be tracked. In addition, the particular cellular carrier in the area where the call was initiated must also be identified. Further, the long distance carrier which serviced any long distance calls, and also local and federal tax charges must also be tracked during every billing cycle. All of these bits of information must then be communicated to the particular organization servicing the owner of the cellular telephone and combined into a single bill to be provided to the operator of the cellular telephone. It is not uncommon for there to be a 90 day lag between when the operator of a cellular telephone makes a call, and when the call is actually billed.

Problems also exist which prevent the benefits of cellular communication from being fully realized. For instance, it may be desirable to provide cellular telephones to employees of certain companies. However, many current telephones have unrestricted dialing privileges which may be abused by employees. Also, due to the difficult nature of billing, tight control and accountability are difficult, if not impossible, to maintain.

Thus, notwithstanding the significant advantages associated with mobile cellular communication, a number of problems remain.

SUMMARY OF THE INVENTION

The present invention is a cellular telephone and system for controlling use of a cellular telephone. The cellular telephone includes a receiver and transmitter for receiving and transmitting cellular communications, respectively. An operator interface is provided for receiving input commands from an operator and providing command signals. A controller is coupled to the transmitter, the receiver, and the operator interface, and controls the transmitter and receiver based on the command signals. The controller includes a memory for storing call rate information indicative of rates charged for the cellular communications and a timer providing a timing signal which is indicative of a time during which a cellular communication takes place. The controller tracks an amount of currency to be charged for the cellular communications based on the call rate information and the timer signal. In addition, an administrator station is provided which includes a second controller so the administrator station can read information from the cellular telephone and program information into the cellular telephone from a remote location.

BRIEF DESCRIPTION OF THE DRAWINGS

FIGS. 5A to 5E show a flow diagram illustrating operation of a cellular telephone according to the present invention.

FIGS. 7A, 7B, 7C, 7D and 7E illustrate embodiments of an operator interface of an administrator station according to the present invention.

DETAILED DESCRIPTION OF THE PREFERRED EMBODIMENTS

Overview of Cellular Communications

Figure 1:
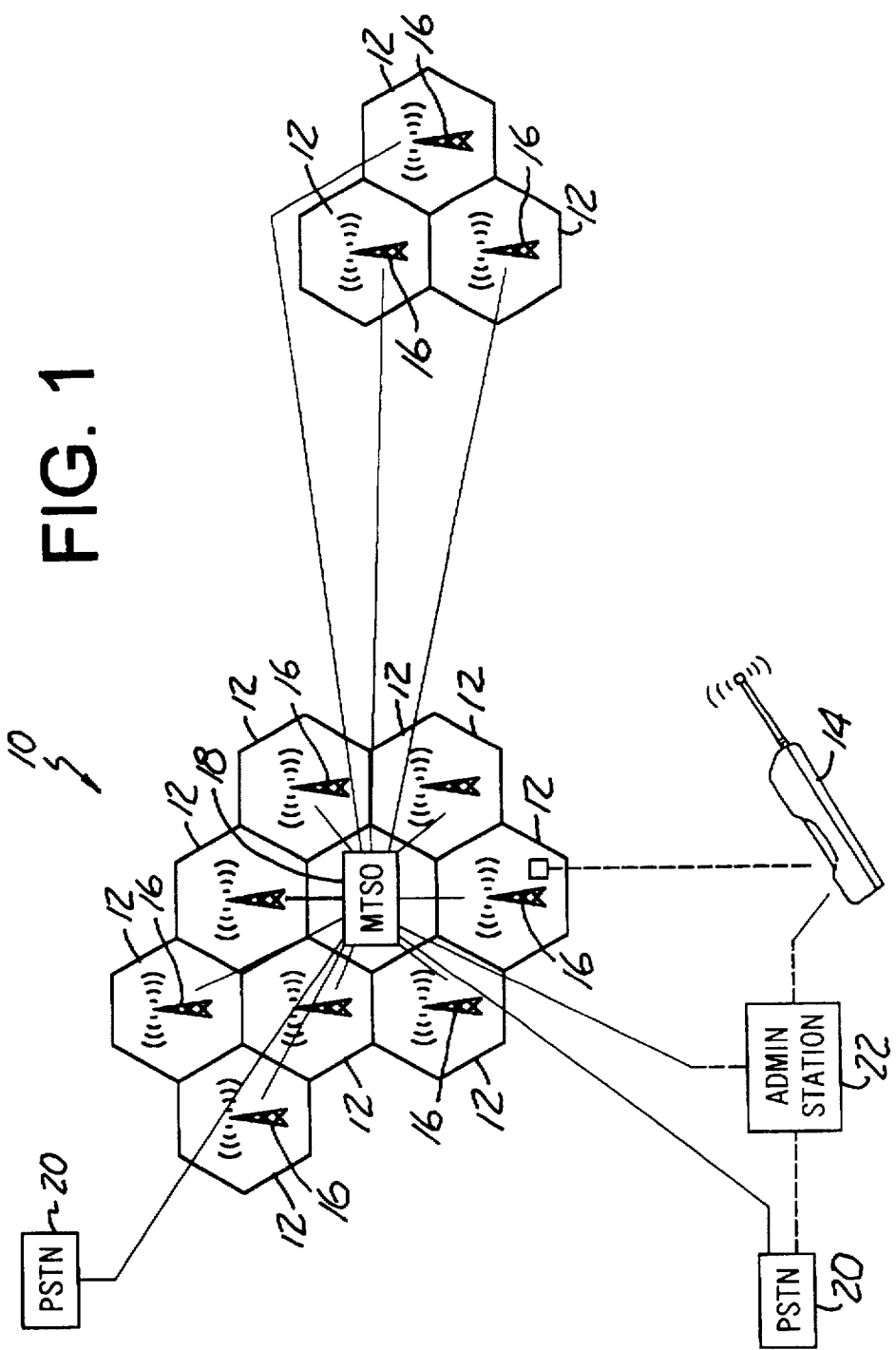
FIG. 1 is a schematic representation of a cellular telephone system.

FIG. 1 is an illustration of a cellular system 10. Cellular system 10 includes a frequency modulated radio network which covers a set of geographical areas commonly referred to as cells 12. Mobile two-way radio units, such as cellular telephone 14, can communicate with one another via a cell site transceiver in cells 12. Each cell 12 includes a base station 16. The base stations are distributed among the cells 12 over the geographical area defined by cells 12.

Base stations 16 are preferably managed by centralized digital switching equipment commonly referred to as a Mobile Telephone Switching Office (MTSO) 18. A base station 16 in its geographical placement is commonly referred to as a cell site. Base stations 16 include a low powered frequency modulated (FM) transceiver, power amplifiers, a control unit and other hardware depending on the particular cellular system configuration. The function of base stations 16 is to interface between cellular mobile telephones, such as telephone 14, and MTSO 18. Base stations 16 communicate with MTSO 18 over dedicated data links, either wire or non-wire, and communicate with mobile telephones, such as cellular telephone 14, over the airwaves.

MTSO 18 controls various communication links including call set-up, call processing and release, signaling, supervision, switching and allocation of RF channels.

MTSO 18 also preferably provides a centralized point at which personnel can perform administration and maintenance tasks for cellular system 10.

MTSO 18 communicates with Public Switched Telephone Networks (PSTNs) 20. PSTNs 20 and MTSO 18 communicate over a wire line communication network. This enables MTSO 18, and cellular system 10, to provide a communication link with conventional wire line telephones.

Cellular system 10, according to the present invention, also includes administrator station 22. Administrator station 22 can be suitably located either within a cell 12, or outside of cells 12. Administrator station 22 includes a controller and communication circuitry for communicating with cellular telephone 14.

Depending on the location and particular configuration of administrator station 22, it can communicate with cellular telephone 14 in a number of ways. If administrator station 22 is within a cell 12 of cellular system 10, and is equipped with a cellular transceiver, administrator station 22 can communicate with cellular telephone 14 through MTSO 18. Further, if administrator station 22 is equipped with a wire line telephone communicator and a modem having a dual tone multiple frequency (DTMF) generator or simply a DTMF generator, administrator station 22 can communicate with cellular telephone 14 through PSTN 20 and MTSO 18. Finally, administrator station 22 is preferably equipped with a suitable connector for physically connecting to cellular telephone 14 and for communicating with cellular telephone 14 through a parallel or serial port from the controller in administrator station 22, or through another suitable direct-connect communication link.

The precise information and control steps which administrator station 22 exchanges with cellular telephone 14 are described more particularly later in the specification. Briefly, however, administrator station 22 preferably contains a memory for storing call rate tables, call detail information, and user profile information. The user profile information preferably includes an identification number specifically identifying each user for which a profile is contained, and various privileges and other information associated with that user. Preferably, administrator station 22 can access all of the information, and manipulate the information in cellular telephone 14 so that administrator station 22 can, for instance, program cellular telephone 14 with additional call privileges, and can download the call detail information from cellular telephone 14. Administrator station 22 can communicate with cellular telephone 14 when telephone 14 is connected to administrator station 22 or located remotely from administrator station 22.

The particular interaction among the various components of cellular system 10 is more specifically described in a variety of references, such as the publication entitled "Designing Cellular Radios with Phillips Components-Signetics Cellular Chip Set" published by the Phillips Company, and the EIA Interim Standard, Cellular System Mobile Station-Land Station Compatibility Specification IS-3-D (Revision of IS-3-C), March 1987, published by the Engineering Department of the Electronic Industries Association, 2001 I Street, N.W., Washington, D.C. 20006; the EIA Interim Standard, Recommended Minimum Standards For 800-Megahertz Cellular Subscriber Units, EIA/IS-19-b (Revision of EIA/IS-19-a), May 1988, also published by the Engineering Department of the Electronic Industries Association at the aforementioned address; and the EIA/TIA Interim Standard, Cellular System Dual-Mode Mobile Station-Base Station compatibility standard IS-54-B, April 1992, by the Telecommunications Industry Association.

Communication Between Administrator Station 22 and Cellular Telephone 14

Figure 2:
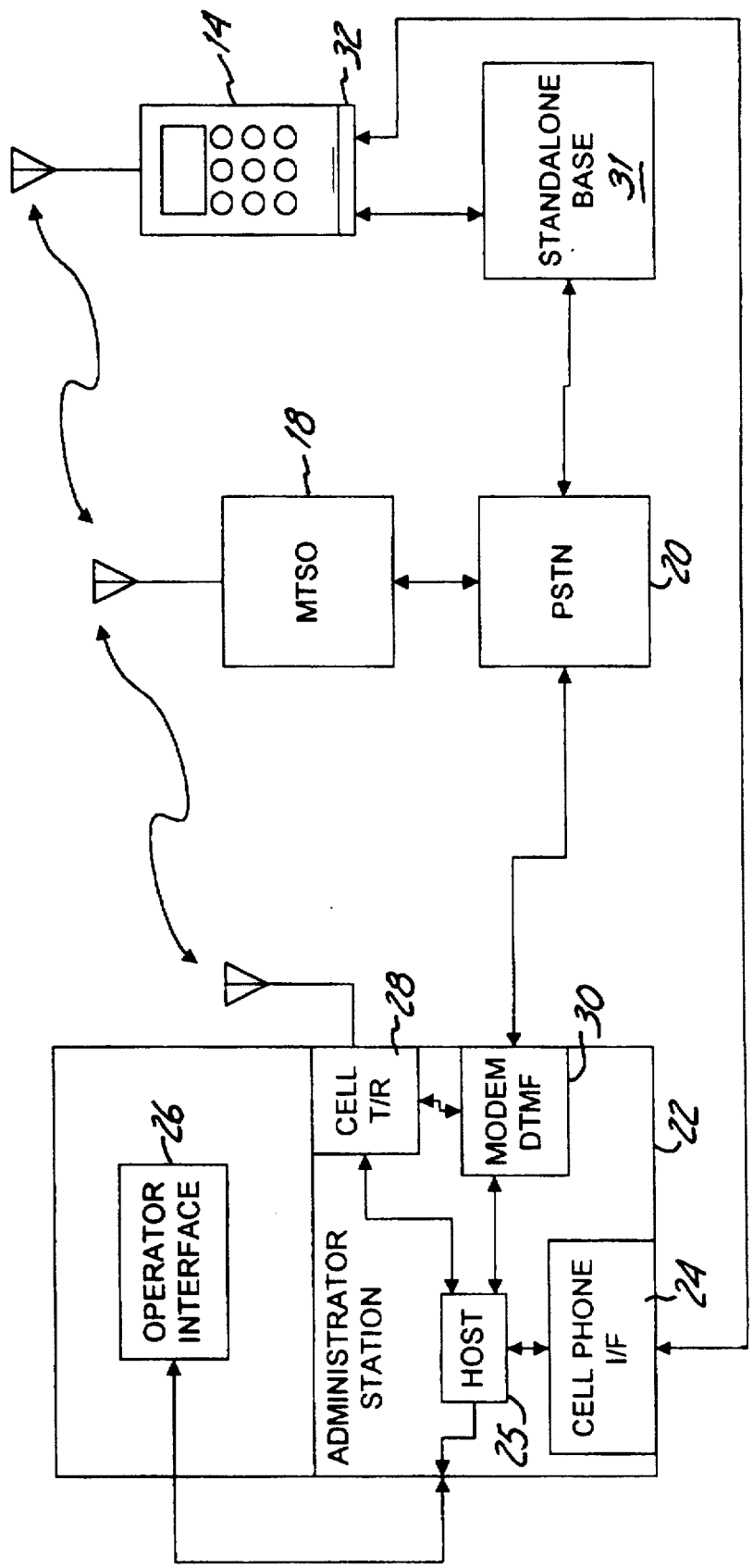
FIG. 2 is a block diagram of a cellular telephone system according to the present invention.

FIG. 2 shows a portion of cellular system 10 having a plurality of cellular telephones 14 and a more detailed block diagram of administrator station 22. In the preferred embodiment, administrator station 22 includes interface controller 24, station controller (host) 25, operator interface 26, cellular transmitter/receiver 28 and modulator/demodulator/DTMF generator (modem/DTMF generator) 30. Host 25 is preferably a digital computer and may have the capability of being coupled to, or networked with, other similar station controllers 25. Interface controller 24 serves as an interface circuit between host 25 and the cellular phone 14. Operator interface 26 is preferably a keyboard along with a CRT or other monitor. However, operator interface 26 can include a membrane keypad, or any other appropriate input device. Cellular transmitter/receiver 28 is preferably a conventional integrated circuit, or a chip set such as that provided by Phillips-Signetics. In addition, modem/DTMF generator 30 is preferably any suitable, and conventional, modem and DTMF generator provided for communication over a wire line or cellular telephone network.

Administrator station 22 can preferably communicate with cellular telephones 14 in one of four ways. As stated earlier, if administrator station 22 is in a cell 12 of cellular system 10, administrator station 22 can communicate with cellular telephones 14 through MTSO 18 and cellular transmitter/receiver 28. In that instance, the operator simply enters appropriate operator inputs or commands into controller 25 through operator interface 26. In response to the input commands, controller 25 controls cellular transmitter/receiver 28 to initiate cellular communication with one of cellular telephones 14 through MTSO 18. Also, any one of cellular telephones 14 can initiate communication with administrator station 22 by providing cellular communication signals through MTSO 18, to cellular transmitter/receiver 28. These signals are, in turn, provided to controller 25 which provides the operator with an appropriate display or signal based on the cellular communication signals received. Once the cellular link is established, control information is passed to the cellular phone 14 from the controller 25 via DTMF tones or modem.

Similar communication can also be accomplished over the wire line telephone system. In that instance, controller 25 utilizes modem/DTMF generator 30 in a known manner to communicate with PSTN 20. PSTN 20, in turn, communicates with MTSO 18 which provides cellular communications to one of cellular telephones 14. Reverse communication can also be accomplished wherein one of cellular telephones 14 initiates cellular communications with administrator station 22, via MTSO 18 and PSTN 20.

Also, cellular telephones 14 are preferably directly connectable to administrator station 22. To that end, cellular telephones 14 are preferably provided with connectors 32. In addition, interface controller 24 is preferably provided with a suitable communications link, such as a parallel or serial port. Connectors 32 can be any suitable form of connector for receiving communications from the communications portion of interface controller 24. In the preferred embodiment, connectors 32 are preferably 15 pin, dual in-line connectors which mate with corresponding connectors on interface controller 24.

Finally, a user is able to place a cellular phone 14 in a stand alone base unit 31. This stand along base 31 connects to the PSTN 20 via modem. Connection to host 25 is provided via modem 30 in the administrator station 22 through PSTN 20 to the stand alone base 31. This embodiment allows the option of communication with a remote site without the use of a separate digital computer. In one embodiment, the stand alone base 31 includes an input device such as membrane keypad to input user information. This user information can then be sent telephonically via PSTN 20 to the host 25. Based on the user information or other information known at host 25, programming information is returned to the cellular phone 14.

Overview of Cellular Telephone 14

Figure 3:
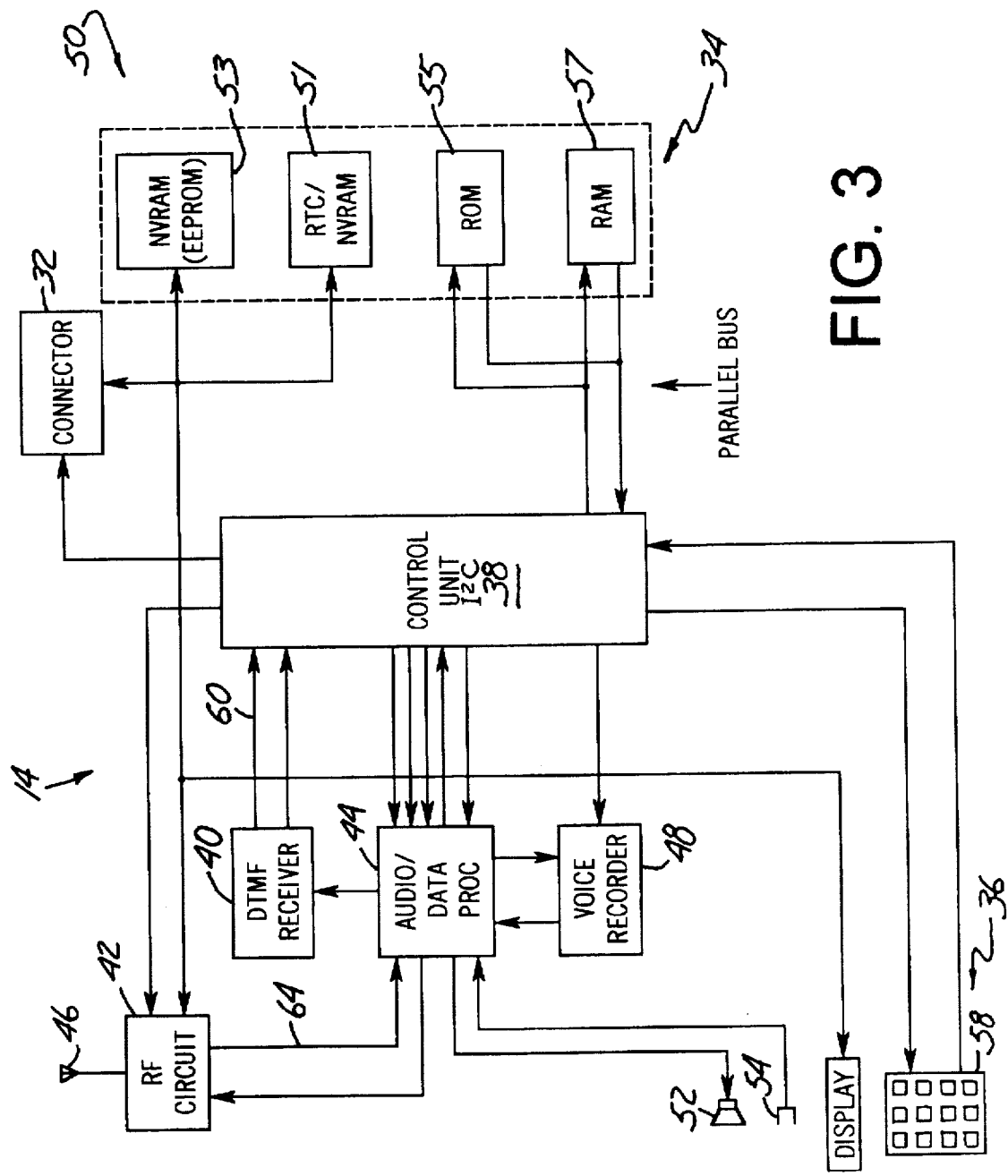
FIG. 3 is a block diagram of a cellular telephone according to the present invention.

FIG. 3 is a more detailed block diagram of a cellular telephone 14 according to the present invention. Cellular telephone 14 is broken into primarily two portions. The first portion is a control and transceiver portion 34, and the second portion is handset portion 36. Handset 36 and transceiver 34 can be separate from one another, joined by electrical cables, or handset 36 and transceiver 34 can be combined in a single enclosure to form an integral unit, such as the cellular telephone 14 depicted in FIG. 1.

Transceiver 34 includes telephone control unit 38, DTMF receiver 40, RF circuit 42, audio and digital signal processor 44, antenna 46, recorder 48, memory 50 which includes non-volatile random access memory (NVRAM) in the form of electrically erasable programmable read only memory (EEPROM) 53, read only memory (ROM) 55, and random access memory (RAM) 57, and connector 32. Transceiver 36 also includes timer circuit 51 which can either be integral with control unit 38, or an external timer circuit, but which preferably operates as a real time clock providing both time and date information and including NVRAM. In systems in which time and date are available in the overhead information, timer 51 may be eliminated.

Handset 36 includes ear piece 52, microphone 54, display 56 and keypad 58. In the preferred embodiment, display 56 is an alpha-numeric display with multiple rows of displayable characters. In addition, keypad 58 preferably includes alpha-numeric keys, and a plurality of function keys which can be actuated to achieve desired functions.

Control unit 38 serves as a primary controller for the circuitry in cellular telephone 14. Control unit 38 is preferably a microcontroller or a microprocessor, integrated circuit chip such as the commercially available S80C552 8-bit microcontroller manufactured by Phillips-Signetics. The operating code and system program is preferably stored in an internal read only memory in control unit 38, or in external read only memory. The system program, as referred to herein, embodies conventional system programming techniques utilized in existing cellular telephones. Furthermore, the system program includes a number of significant improvements over existing system programs for implementing the procedures described herein and illustrated in the present drawings.

Antenna 46 receives radio frequency communications and transmits them to RF circuit 42. RF circuit 42 provides a radio communication link between cellular telephone 14 and MTSO 18. RF circuit 42 provides DTMF tones, which it may receive, to DTMF receiver 40 via audio/data processor 44. DTMF receiver 40 is preferably a commercially available SSI-75T204 integrated circuit chip manufactured by Silicon Systems, Inc. DTMF receiver 40 receives and decodes the DTMF tones and provides them to control unit 38.

Upon recognizing a valid DTMF tone, DTMF receiver 40 notifies control unit 38 of the present DTMF tone by way of a control line 60. DTMF receiver 40 decodes the DTMF tone and provides control unit 38 with a digital data signal on data line 62 representative of the numeric value of the decoded tone.

After receiving a DTMF tone, DTMF receiver 40 looks for the absence of the DTMF tone for a predetermined amount of time. In the event that an additional DTMF tone is not provided within the predetermined time, DTMF receiver 40 concludes that a valid gap requirement between DTMF individual tones has been met and prepares for the reception and decoding of the next DTMF tone. The next tone, as with the first tone, is decoded and provided in digital form to control unit 38. Thus, DTMF receiver 40 provides control unit 38 with a digital data sequence representing numeric values which correspond to the DTMF tones received and decoded by DTMF receiver 40. The decoded information is preferably stored in internal or external RAM for subsequent retrieval.

In addition, in the preferred embodiment, control unit 38 can, in certain modes of operation (such as the conversation mode) cause alpha-numeric information received from the DTMF receiver 40 to be displayed on display 56 in handset 36. Thus, the alpha-numeric information received by the cellular telephone can be viewed by the cellular telephone user as the information is received, or after the information is stored in internal or external RAM upon subsequent retrieval.

RF circuit 42 also receives audio and digital data signals. These signals are provided to audio and digital data processor 44 which performs conventional processing of the audio and digital signals and provides process signals to control unit 38. Audio and digital signal processor 44 also provides processed signals from a variety of sources to RF circuit 42 for transmission via antenna 46. In essence, audio and digital signal processor 44 controls communication of audio and digital signals between control unit 38, microphone 54, speaker 52, and RF circuit 42.

Incoming cellular communication data received via antenna 46 is demodulated by RF circuit 42 in a conventional manner such that the demodulated audio signal is provided via output path 64 to audio and digital signal processor 44. Voice information and system control data provided by RF circuit 42 is processed in the audio and digital signal processor 44 in a conventional manner. Audio and digital signal processor 44, in turn, provides voice information to speaker 52. The system control information, on the other hand, is provided to control unit 38 for further processing.

To initiate a call using cellular telephone 14, the user enters a desired telephone number, via keypad 58 or from an internal dialing directory, priority keys, pager memory, or scratch pad memory. In the preferred embodiment, the telephone number is simultaneously displayed on display 56 as the telephone number is entered. Control unit 38, in turn, operates in a conventional manner to provide the various output and control signals to the audio and digital signal processor 44. Further, microphone 54 provides an audio voice input signal to audio and digital signal processor 44. Upon receipt of the control signals from control unit 38 and the voice signals from microphone 54, audio and digital signal processor 44 provides a modulated input to RF circuit 42. RF circuit 42, in turn, provides a modulated radio signal for broadcast to MTSO 18 by way of antenna 46.

Solid state recorder 48 is included for recording and playing back voice messages. In this way, solid state recorder 48 provides flexibility to cellular telephone 14 to act as its own answering machine, or voice mail box. This is described in greater detail in co-pending U.S. Patent application Ser. No. 08/294,414, filed on Aug. 23, 1994 entitled CELLULAR TELEPHONE WITH ANSWERING MACHINE AND PERSONAL PAGER FEATURES and assigned to the same assignee as the present invention.

Cellular Telephone 14 In Greater Detail

Figure 4:
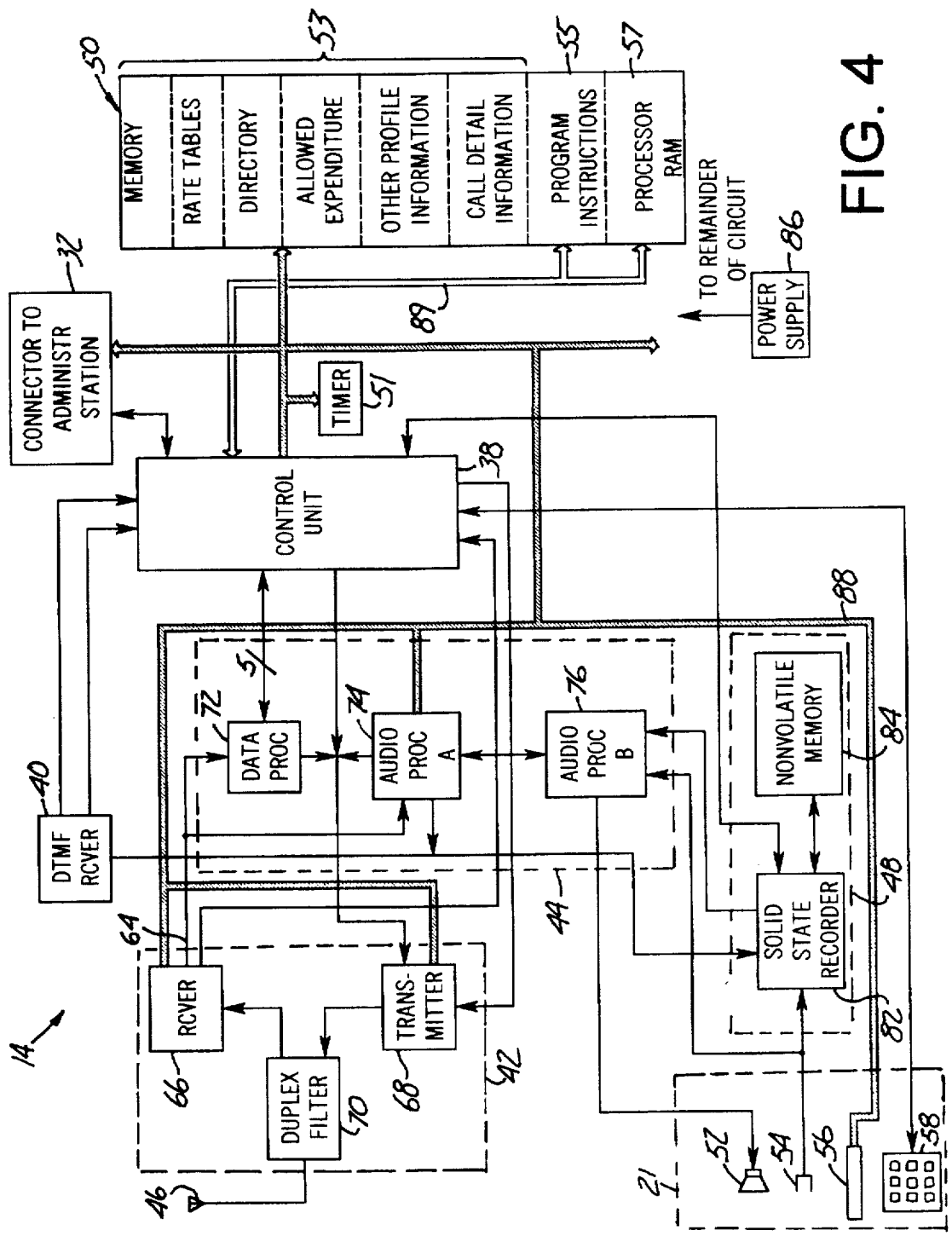
FIG. 4 is a more detailed block diagram of the cellular telephone shown in FIG. 3.

FIG. 4 is a more detailed block diagram of cellular telephone 14 according to the present invention. Similar items are similarly numbered in FIGS. 3 and 4. FIG. 4 shows that, in the preferred embodiment, RF circuit 42 includes receiver 66, transmitter 68 and duplex filter 70. Audio and digital signal processor 44 includes data processor 72, and audio processors 74 and 76. ROM 55 preferably stores program instructions, and RAM 57 and EEPROM 53 preferably store a variety of other information which will be described in greater detail later in the specification. Solid state recorder 48 includes solid state recorder circuit 82 and non-volatile memory 84. FIG. 4 also shows that cellular telephone 14 includes a power supply 86 and a pair of data buses ($I^2C$ bus 88 and parallel bus 89) which service a number of the components of cellular telephone 14.

Data processor 72 is preferably a commercially available UMA1000 integrated circuit chip manufactured by Signetics, and audio processors 74 and 76 are preferably integrated circuit chips designated as NE/SA 5751 and NE/SA 5750, respectively, which are commercially available and manufactured by Signetics.

The primary operational features of the circuitry in cellular telephone 14 is, in part, conventional and is described in the reference entitled DESIGNING CELLULAR RADIOS WITH PHILLIPS COMPONENTS-SIGNETS CELLULAR CHIP SET published by Signetic-Phillips, and in the previously mentioned EIA interim standards. The present invention, however, is primarily directed to the interaction between memory 50, control unit 38 and administrator station 22.

It should be noted that, in preferred operation, control unit 38 controls the ring volume to incrementally increase until it either reaches a maximum threshold or until it is answered. With each subsequent call, the volume is again reset to its initial level.

User Profile Information

In accordance with the present invention, before an operator is provided with access to a cellular telephone 14, an operator profile or user profile corresponding to the operator is loaded into memory 50 in telephone 14 by administrator station 22. This is accomplished using one of the communication links described with reference to FIG. 2. In a preferred embodiment, the operator profile includes an operator identification code identifying the operator. The profile information also includes an allowed expenditure, or call credit, which reflects an amount of currency which the operator of cellular telephone 14 is authorized to spend on cellular communications with cellular telephone 14 during a predetermined time period. The operator profile may also include other profile information, such as a directory (which may be restricted) which holds an authorized directory of telephone numbers with which the operator of cellular telephone 14 can initiate communication, call rate information and operator privileges. Privileges preferably include the ability to modify the user's own profile, the ability to activate, deactivate and utilize certain function keys, and the ability to load and modify the dialing directory. Also, other functions preferably performed by administrator station 22, may also, if desired, be performable by cellular telephone 14, including the ability to export and edit call detail records and billing information, the ability to edit the owner or operator identification code, the ability to view and load call rate information, and the ability to load additional call credit.

All of these parameters, and any other reasonable parameters, are provided in the user's profile information which is downloaded from administrator station 22 into memory 50. This information is accessed by control unit 38 in controlling cellular telephone 14. In addition, EEPROM 53 also preferably tracks the call records of calls made and received by cellular telephone 14. This information is stored as call detail information, and is accessible by administrator station 22. The call detail information (or summary portions of the information) may also be accessible by the operator, depending upon the particular operator profile stored in memory 50.

One Embodiment Of Operation Of Cellular Telephone 14

FIGS. 5A–5E illustrate certain aspects of operation of cellular telephone 14 according to the present invention. It is assumed that, prior to power up of telephone 14, the appropriate operator profile information has been programmed into the telephone from administrator station 22 and loaded into the non-volatile RAM in memory 50. Then, once the phone is powered up, the hardware in the telephone is initialized by control unit 38. This is indicated by block 90. During initialization, the circuitry is powered up in a desired order, and the system ensures that the power up is complete.

Once the hardware is initialized, control unit 38 determines whether the non-volatile RAM in memory 50 is to be initialized with default parameters. If so, the default parameters are entered into the non-volatile RAM in memory 50. If not, processing proceeds. During initialization, a location in the non-volatile EEPROM portion 53 of memory 50 is identified and written to, and then read from. This assures that the buses in the circuit are responding appropriately.

Telephone 14 is programmed with an electronic serial number. This is used by the overhead information and essentially determines the entity billed for calls made on cellular telephone 14. Once the memory has been initialized, telephone 14 determines whether the electronic serial number has been tampered with. The electronic serial number is stored in two places in memory in telephone 14 and is scrambled. These numbers are retrieved and compared to determine whether any tampering has taken place. If so, control unit 38 locks up all operations of cellular telephone 14. This is indicated by blocks 96 and 98.

Next, the system variables used in the software in cellular telephone 14 are initialized. This is indicated by block 100.

Cellular telephone 14 can also be locked by the user entering a desired locking code. If cellular telephone 14 is locked upon power up, an unlock code must be entered via keypad 56 in order to unlock the phone for operation. If the phone is locked, control unit 38 determines whether the unlock code has been entered within a certain time interval of power up (e.g., 30 seconds). If so, processing is allowed to continue. If not, control unit 38 turns cellular telephone 14 off. This is indicated by blocks 102, 104 and 106.

In one preferred embodiment, the RAM portion of memory 50 in cellular telephone 14 includes a battery backup feature. With such a configuration, the call detail for any current call is stored in the RAM. If power is interrupted to cellular telephone 14 before the call detail is recorded in the normal course of operation, the call detail is continually updated with the duration of the call while the power is applied, and backed up by an internal battery backup circuit. Therefore, the call detail will not be lost in case of a premature power interruption. Rather, the next time the user powers up the phone, the unrecorded call detail will be retrieved from RAM and stored in the call detail storage portion of memory 50. This is indicated by blocks 108 and 110.

Control unit 38 next determines whether the call credit available is less than a warning level or threshold. If so, control unit 38 warns the user that remaining call credit is getting low by causing the remaining call credit to be displayed on display 56. This is indicated by blocks 112 and 114.

Control unit 38 then determines whether the operator has depressed a shift key on keypad 58. If so, this indicates that the user wishes to enter a diagnostic mode which is primarily used in the factory for trouble shooting the circuits in cellular telephone 14. Entry of the diagnostic mode may optionally be provided to the customary end user of cellular telephone 14. This is indicated by blocks 116 and 118.

Control unit 38 then performs an initialization function. This is a well known function performed by all cellular telephones and essentially sets up the hardware in cellular telephone 14 to operate with the particular control channels in the cellular system within which it is operating. This is indicated by block 120.

Control unit 38 then responds to overhead signals and determines whether the system identification variable (SID) for the system matches the system identification variable (SID) for the phone. This is determined once cellular telephone 14 is operational on a control channel in the system. If the SID for the system matches the home SID for the telephone, cellular telephone 14 is in its home system. If not, cellular telephone 14 is outside its home system, and roaming charges apply. If roaming charges apply, a roaming flag is set and the home SID in the cellular telephone 14 is reset to match the received SID for the particular system within which it is operating. Then, the initialization step at block 120 is repeated and control continues. This is indicated by block 122.

Control unit 38 then determines whether it is time for a registration or audit order. This is a system response performed by all cellular telephones. Essentially, cellular systems require cellular telephones to periodically power up and indicate to the system the current location of the particular cellular telephone. This allows the system to locate the cellular telephone 14 when a caller is trying to reach the particular cellular telephone, without having to poll the entire cellular system. This is indicated by block 124. If control unit 38 determines that it is time for registration or audit, control skips to block 126 in FIG. 5C. Control unit 38 causes cellular telephone 14 to enter the system access state. This is essentially the state in which cellular 14 indicates its location to the system, and indicates that it is available to answer a call. This essentially starts the hand shaking between cellular telephone 14 and the particular cellular system in which it is located. Once this is complete, flow through the program essentially continues until flow returns to block 122.

If, at block 124, it is determined that it is not time for registration or audit, then control unit 38 determines whether there has been a page match. In essence, when someone is trying to call cellular telephone 14, the cellular system within which cellular telephone 14 is operating sends out a page. Cellular telephone 14 determines whether the telephone number requested by the page matches the telephone number for cellular telephone 14. If so, control unit 38 then determines whether incoming messages (either in a pager mode in which cellular telephone 14 operates as a pager or conversation mode in which cellular telephone 14 operates in a conventional manner) are allowed. Cellular telephone 14 can be placed in a mode in which no calls are accepted. If this is the case, cellular telephone 14 simply does not respond to the page and control returns to block 122. However, if either pager mode or incoming calls are allowed, then cellular telephone 14 enters the system access state in block 126. This is indicated by blocks 128 and 130. This will be described in greater detail later in the specification.

If, at block 128, control unit 38 determines that there is no page match, then control unit 38 determines whether the user of cellular telephone 14 is initiating a call. This is indicated by block 132. If a call is being initiated, control continues at block 140, and this will be described shortly. However, if no call is being initiated, control unit 38 determines whether the user is performing a menu function. Cellular telephone 14 is suitably programmed to display a menu on display 56. This displayed menu can be manipulated by the user of cellular telephone 14 to perform certain functions. If a menu function is being requested, control unit 38 determines whether the particular user handling cellular telephone 14 is allowed to perform such functions. If so, the function is performed. If not, the control returns to the response to overhead state in block 122. This program flow is indicated by blocks 134, 136 and 138.

If, at block 132, control unit 38 determines that the user is initiating a call, program flow continues at block 140. Certain functions including priority key dialing, keyboard (or keypad) dialing, scratchpad dialing and directory dialing are provided with cellular telephone 14. Each of these privileges or functions can be disabled within cellular telephone 14. At block 140, control unit 38 determines whether the user is attempting to dial using a priority key. In this mode, a single key on keypad 58 is programmed to dial a preset number. If a priority key is being depressed, control unit 38 determines whether priority key dialing is allowed based on user profile information. If not, a restricted message is displayed and control returns to the response to overhead state in block 122. This is indicated by blocks 142 and 144.

If priority key dialing is allowed, control unit 38 determines whether the number of digits dialed are allowed. In other words, seven digits indicate a local call only, while ten or eleven digits indicate a long distance call. The user profile information stored in memory 50 indicates whether the particular user of cellular telephone 14 is allowed to dial long distance. This determination is made at block 146. If the number of digits dialed are allowed, then control unit 38 calculates the maximum call duration allowed for the call currently requested. This is based on the amount of call credit remaining and the costs associated with the current call, including whether roaming charges apply, whether the call is local or long distance, whether peak rates apply, and any other items programmed into cellular telephone 14, such as international rates, taxes or other charges. These items of information are preferably stored in look-up table form in non-volatile RAM in memory 50. This is indicated by block 148. Once the maximum call duration has been calculated in block 148, operation continues at block 126.

If, at block 140, control unit 38 determines that a priority key has not been depressed, then control unit 38 determines whether a number has been entered from keyboard 58. If so, control unit 38 determines whether keyboard dialing is allowed based on user profile information. If not, the restricted message is again displayed. This is indicated by blocks 150 and 152. If the user of cellular telephone 14 is entering a number through keyboard 58, and if keyboard dialing is allowed, then processing continues at block 146.

If, at block 150, keyboard dialing is not being initiated, control unit 38 then determines whether a number is being entered from a scratchpad memory. When this feature is active, the user of cellular telephone 14 can enter a number into scratchpad memory while talking on the telephone 14 or receive a number from the other person when that person enters that number from a touch-tone phone. For instance, if the person to whom the user is talking gives the user a telephone number, while they are talking, the user can enter that telephone number on keyboard 58, or receive a number from the other person when that person enters that number from a touch-tone phone and that number will appear in display 56. Then, when the user of cellular telephone 14 is finished talking, and hangs up, the number entered in the scratchpad memory (and displayed at display 56) remains displayed. The user of cellular telephone 14 then merely depresses the send key on keyboard 58 and the displayed scratchpad number is dialed. If this feature is disabled, then the restricted message is again displayed as indicated in block 144. However, if the feature is enabled, control continues at block 146. This is indicated by blocks 154 and 156.

If, at block 154, it is determined that the user of cellular telephone 14 is not entering a number from the scratchpad memory, then control unit 38 determines whether a number is being dialed from the dialing directory. When this feature is enabled, certain memory locations in the non-volatile RAM in memory 50 are programmed with particular telephone numbers. To dial one of these telephone numbers, the user of cellular telephone 14 typically depresses a recall button on keyboard 58 and a particular memory location. The telephone number stored in that particular memory location is then displayed in display 56. The user of cellular telephone 14 then depresses the send key and the number recalled from the dialing directory is dialed. If this feature is not allowed, the restricted message is again displayed at block 144. If it is allowed, then control continues at block 146. This feature is indicated by blocks 158 and 160.

Emergency calls are never disabled. Therefore, if an emergency call is made, control skips directly to block 126. This is indicated by block 162. Once, through any of these branches, the program flow reaches block 126, and the hand shaking associated with block 126 has been performed, then the cellular system in which cellular telephone 14 is operating assigns a dedicated voice channel to the communication being undertaken. In other words, the cellular telephone 14 is removed from one of the control channels and assigned a dedicated voice channel so that the parties attempting communication can communicate without interference. This is indicated by block 164.

Once this is complete, cellular telephone 14 enters the conversation state on the cellular system. In this state, both the caller and the receiver are on the dedicated channel. All data transfer has been completed and verified or confirmed, and the voice channel is opened so that the two parties can begin talking. This is indicated by block 166.

If control unit 38 has determined that an emergency call is in progress, all call restrictions are bypassed and control proceeds directly to block 182. This is indicated by block 168.

If control unit 38 has not determined that an emergency call is in process, then control unit 38 determines whether the current battery level is less than or equal to a critically low level. In the preferred embodiment, cellular telephone 14 retains enough battery power to record call length and all other relevant call detail information. Therefore, control unit 38 cuts off the cellular communication once a minimum battery threshold is reached which may jeopardize the ability to save the call detail information. This is indicated by block 170. If the battery level is less than or equal to the critically low threshold, control proceeds to block 184 and the voice channel is released and the call is terminated.

Assuming that the battery level is not critical, control unit 38 then determines whether the present call duration is greater than or equal to the maximum call duration calculated in block 148. If so, control again proceeds to block 184 and the voice channel is released and the call is terminated. If the call duration is still below the maximum duration calculated in block 148, then control unit 38 determines whether any DTMF tones have been received. The call duration and DTMF tone determination are performed in blocks 172 and 174. If DTMF tones are not received, control skips to block 178.

However, if DTMF tones are received, then control unit 38 determines whether transmission and receipt of DTMF tones is allowed. In essence, if DTMF tones are being entered, then control unit 38 assumes that the sender of the DTMF tones is trying to enter the administrative data mode or enter a number into scratchpad memory. If not, control returns to the conversation state indicated by block 166. The determination of whether DTMF transmission and receipt is allowed is made in block 176. If DTMF tones are allowed, then control unit 38 determines whether the particular sequence of DTMF tones required to enter the administrative data mode have been received. This is indicated by block 178. The administrative data mode is indicated by block 180 and a portion of this mode is described in greater detail in flow diagrams 6A and 6B.

If the administrative data mode code is not received, then control unit 38 simply displays the entered DTMF numbers and stores the numbers in scratchpad memory. This is indicated by block 181.

After the call is terminated in block 182, control unit 38 proceeds to release the voice channel as indicated in block 184. Once the voice channel is released, controller 38 determines whether the call duration for the immediately previous call exceeded a call credit interval. In other words, if the call duration is less than a minimum interval, there is no charge made for the call. For instance, if a call lasts less than nineteen seconds, control unit 38 assumes the call was to a wrong number and does not bill the call. The call duration determination is made in block 186.

Assuming that the call duration exceeded the minimum call credit interval, then control unit 38 calculates the costs of the call. This is based upon all the relevant information mentioned previously in the specification and any other desired charges which may be applied. This is indicated in block 188.

The non-volatile RAM in memory 50 in cellular telephone 14 has a maximum capacity. Therefore, there are a maximum number of call detail records which can be written into the non-volatile RAM in memory 50. In one preferred embodiment, if the maximum number of call detail records have already been written, then a flag is set in control unit 38 and the phone is turned off until the call detail records are downloaded into the administrator station.

Figure 5A:
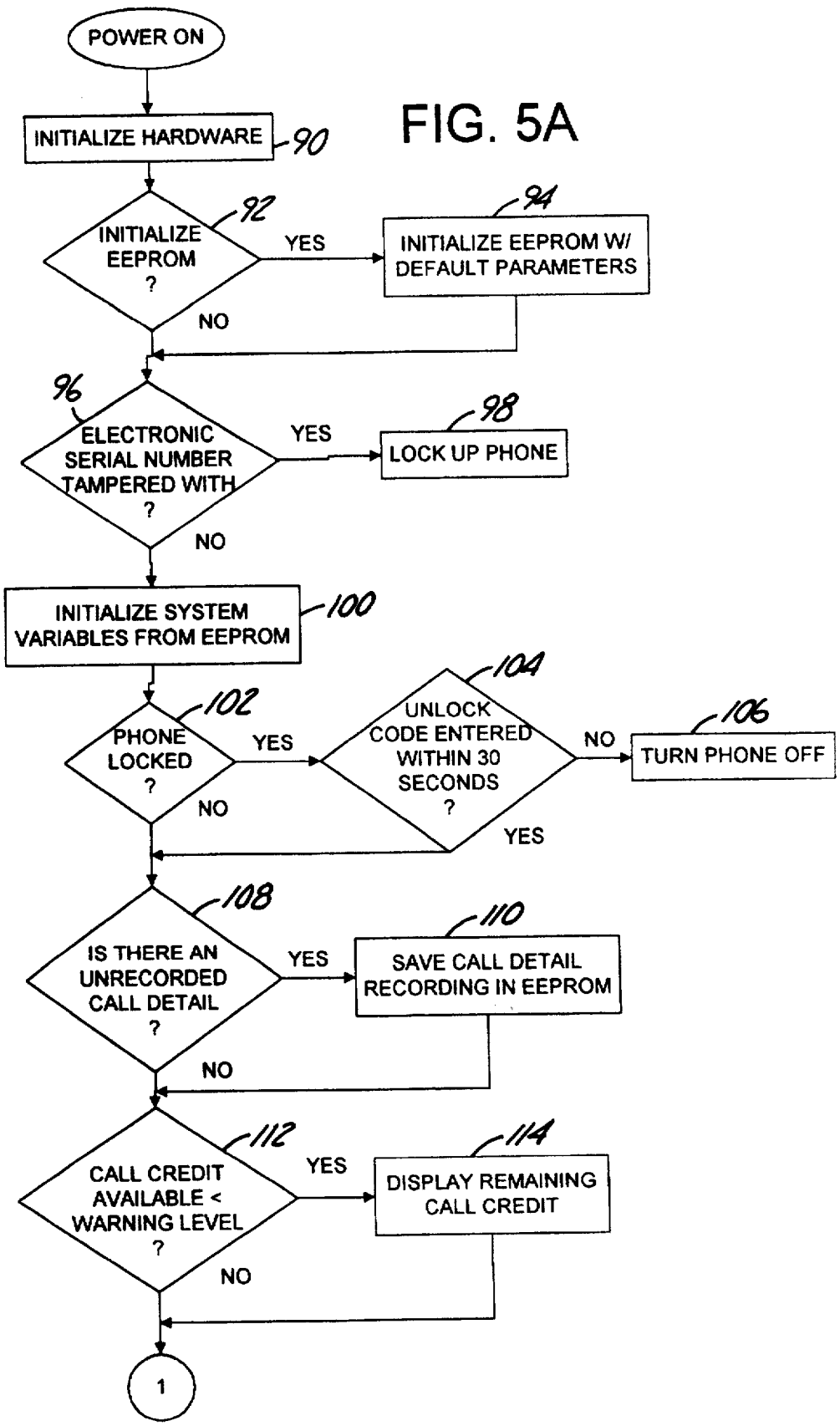
Figure 5B:
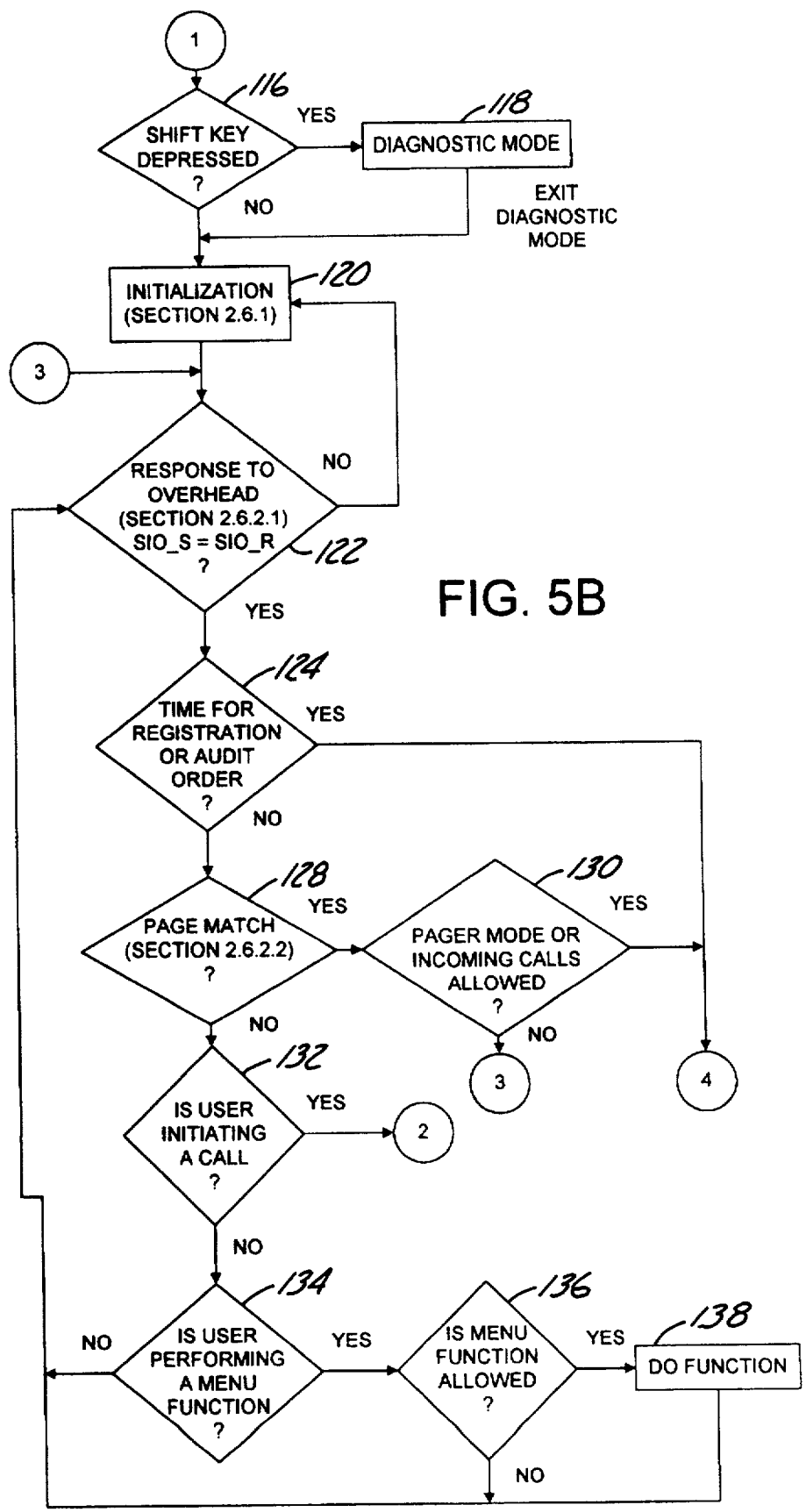
Figure 5D:
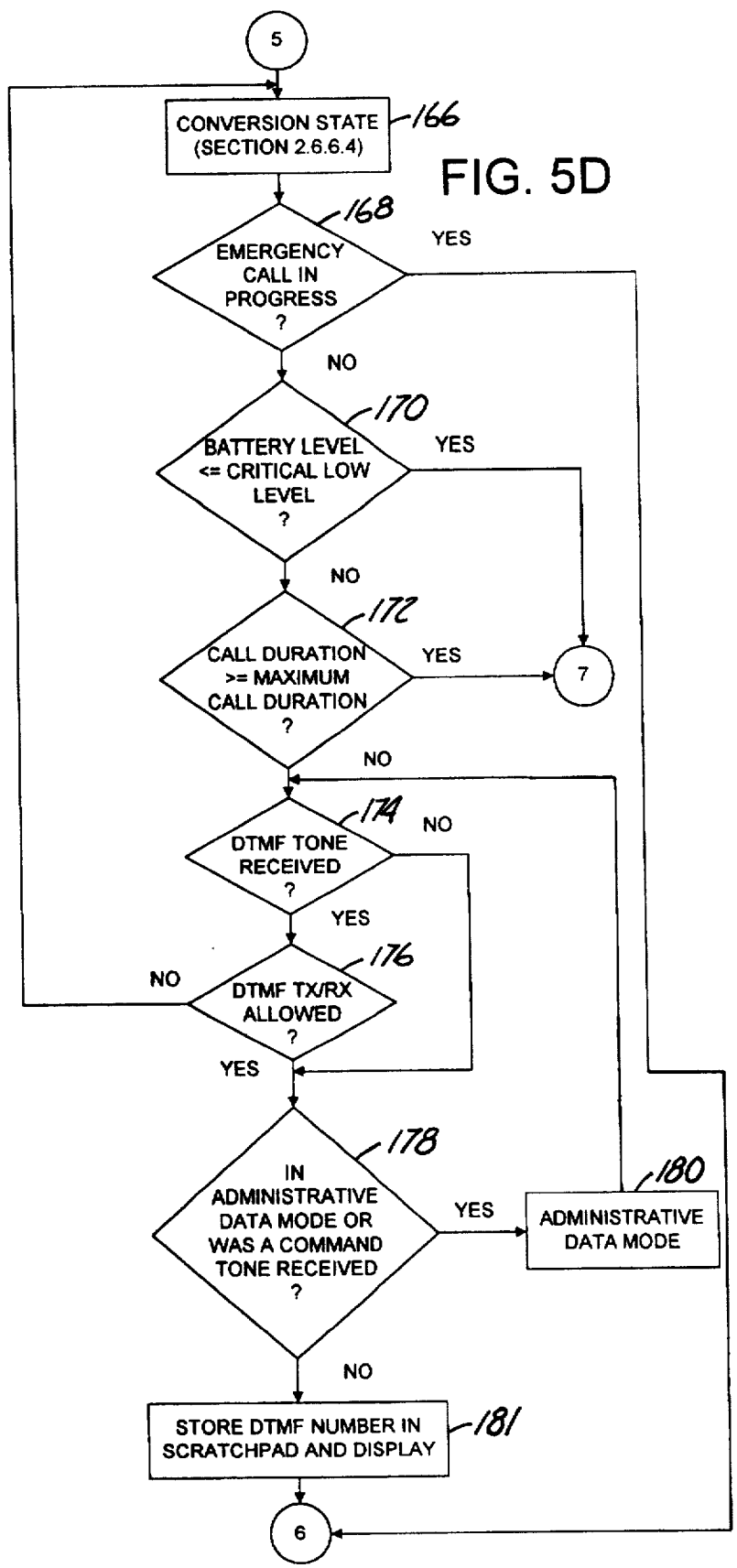
Figure 5E:
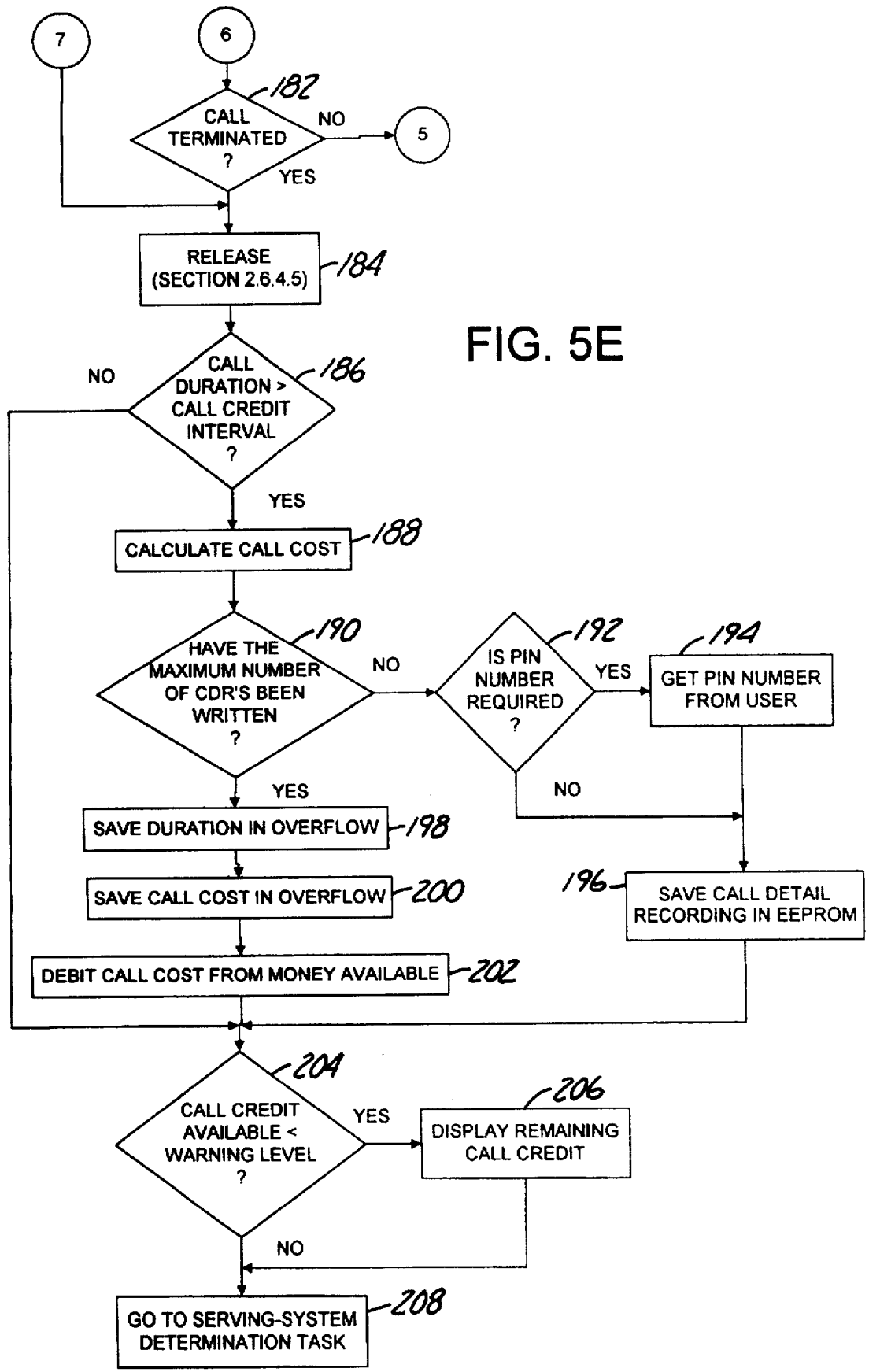

However, another preferred embodiment is illustrated in FIG. 5E. Control unit 38 first determines whether the maximum number of call detail records have been written to memory 50. This is indicated by block 190. If not, as will be typical, control unit 38 determines whether an identification number is required. If this feature is enabled, the user of cellular telephone 14 is able to assign a certain client number or file number to each cellular communication. In this way, when the call detail record is printed out, it can be sorted by client or file number so that a client or file can be billed for all the cellular communications made in regard to that particular client or file. If the identification number is required, then the user enters the identification number and the call detail is saved. If no identification number is required, then the call detail is simply saved without the identification number being entered. This sequence is indicated by blocks 192, 194 and 196.

If the maximum number of call detail records have been written, as determined in block 190, then control unit 38 simply causes the duration of the previous call and the cost of the previous call to be saved in overflow memory. Control unit 38 also causes the cost of the previous call to be subtracted from the remaining credit or money available to the user of cellular telephone 14. Therefore, even if there is no room in the non-volatile RAM in memory 50 to record the call detail record, the debit feature of cellular telephone 14 remains active and the user of cellular telephone 14 can continue to use the telephone until the call credit has been used. This is indicated by blocks 198, 200 and 202.

When the program reaches block 204, control unit 38 determines whether the remaining call credit available to the user of cellular telephone 14 has passed a warning level threshold. If so, the remaining call credit is displayed on display 56 and control unit 38 returns to a mode in which the serving system is determined. Essentially, this requires return in the program flow to the response to overhead state in block 122. These items are indicated by blocks 206 and 208.

It should also be noted that, since cellular telephone 14 has a display 56, any suitable messages or alerts can be displayed to the operator by controller 38 at display 56. A common display is the amount of call credit accrued during any particular cellular communication and the amount of call credit remaining in the particular cellular telephone 14.

Update Operation of Administrator Station 22

Figure 6A:
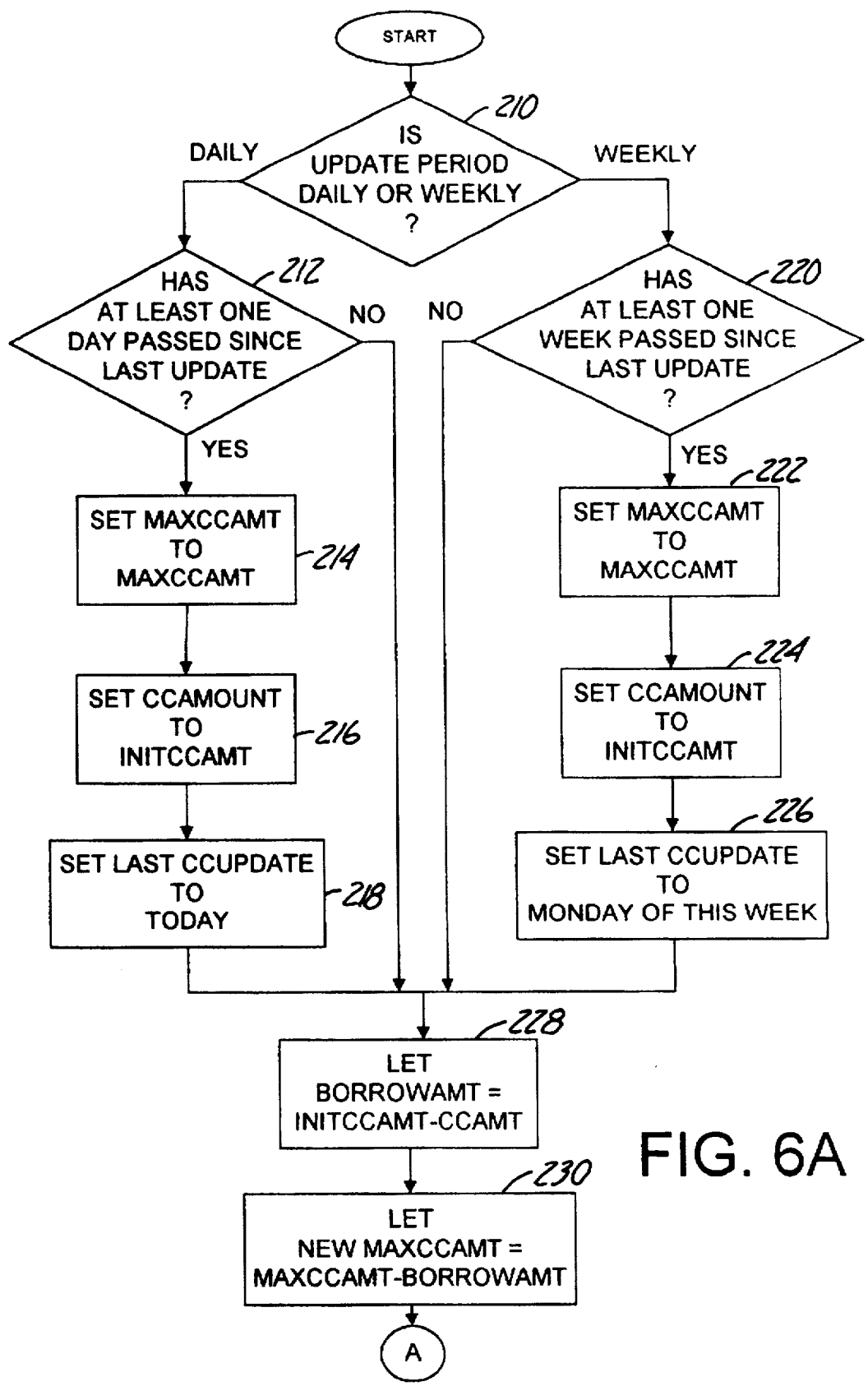
FIGS. 6A and 6B show a flow diagram illustrating operation of an administrator station according to the present invention.
Figure 6B:
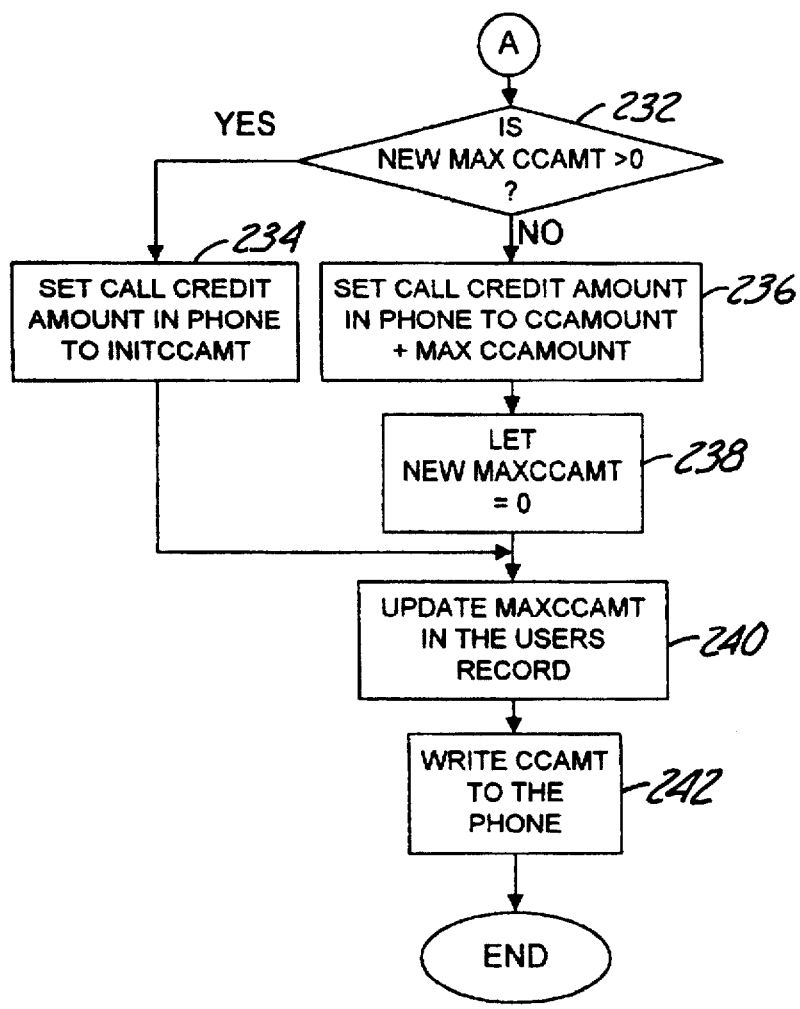

FIGS. 6A and 6B illustrate a portion of the operation of administrator station 22. The operation illustrated in FIGS. 6A and 6B is the update operation which updates a particular cellular telephone 14 with additional call credit on a periodic basis (e.g., daily, weekly, monthly or yearly—though FIGS. 6A and 6B only speak to a daily or weekly update).

The following descriptors are used in FIGS. 6A and 6B:

InitCCAmt-this is the amount of money the user is entitled to at the beginning of every operational period.

MaxCCAmt-this is the maximum amount of money the user is entitled to during a specified update period.

MaxCCPeriod-this is the update period and specifies how often MaxCCAmt is replenished. The allowed periods are preferably daily, weekly, monthly and yearly (although, for the sake of simplicity, only daily and weekly update periods are illustrated in FIGS. 6A and 6B).

CCAmount-this is the amount of money that was last unloaded from cellular telephone 14 when it was in use by the current user.

MaxCCAmount-this the amount of money left in the user's account for this period.

LastCCUpdate-this is the last date on which the user's call credit accounts were theoretically updated. It is worth noting that this is not necessarily the date on which the update actually occurred. For example, if the call credit amount was to be replenished every week and the first time the user operated cellular telephone 14 was Wednesday, then the LastCCUpdate would be Monday of that week, while the actual update would occur on Wednesday. This is done to assure that the update date does not drift through an entire period depending on when the user first operates the telephone.

BorrowAmt-this term is calculated as the amount required to borrow from the MaxCCAmount allotted during a given period to cover existing cellular communications.

Controller 25 of administrator station 22 first determines whether the update period is daily or weekly. It should be noted that any suitable update period can be used and the logic will simply be changed to accommodate the given update period. However, for the sake of simplicity, the present description will proceed only with respect to a daily or weekly update. The determination of the update period is indicated in block 210.

The update period specifies the particular time at which the user's call credit accounts are replenished. For example, a daily update period allows the user to get full MaxCCAmt every day that the telephone is used. A weekly update period updates the user's call credit balance every Monday. If a telephone is not used on Monday, the account is updated on the first day of the week in which it is used.

If controller 25 determines that the update period is daily, controller 25 then determines whether at least one day has passed since the last update. If a day has not passed, no new update is authorized and operation skips to block 228 which is described later in the specification. However, if at least one day has passed, then controller 25 sets MaxCCAmount to MaxCCAmt. In other words, MaxCCAmt is obtained from the rate table in memory 50 or memory associated with controller 25 and placed into the MaxCCAmount field of the user's record. These steps are indicated by blocks 212 and 214.

Controller 24 then obtains InitCCAmt from the rate table in memory 50 or memory associated with controller 25 and sets it into the CCAmount field of the user's record. This is indicated by block 216. Controller 25 then sets LastCCUpdate to the present date. This is indicated by block 218. Operation then continues at block 228 as described later.

If, at block 210, controller 25 determines that a weekly update period has been authorized, then controller 25 determines whether at least a week has passed since the last update. This is indicated by block 220. If a week has not passed, then, as with block 212, no update has been authorized and control moves to block 228. However, if a week has passed, then controller 25 takes a number of steps. First, controller 25 sets the MaxCCAmt from the rate table in memory 50 or other memory into the MaxCCAmount field for the present user, then sets CCAmount to InitCCAmt from the rate tables, and then sets LastCCUpdate to Monday of the present week. All of these steps are indicated by blocks 222, 224 and 226.

After updating the LastCCUpdate term (whether the update period is daily or weekly) controller 25 then lets BorrowAmt equal InitCCAmt−CCAmt. This is indicated by block 228. In this block, controller 25 is essentially calculating the amount of call credit which must be borrowed from the maximum call credit allowed during the relevant period for the identified user.

Controller 25 then lets NewMaxCCAmt equal MaxC-CAmt minus BorrowAmt. In other words, NewMaxCCAmt is the old amount which was left in the user's account for the present period, less the BorrowAmt which is the amount required to cover the present cellular communications. This is indicated by block 230.

Controller 25 then determines whether the term NewMaxCCAmt is greater than zero. This is determined by block 232. If NewMaxCCAmt is greater than zero, then controller 25 sets the call credit amount in telephone 14 to InitCCAmt. This is indicated block 234. In other words, the operator of cellular telephone 14 has now obtained a full call credit loaded into cellular telephone 14 for the given period.

However, if NewMaxCCAmt is not greater than zero, then controller 25 programs cellular telephone 14 by setting the call credit amount in cellular telephone 14 to CCAmount plus MaxCCAmount. Controller 25 then lets NewMaxCCAmt equal zero. In other words, controller 25 programs cellular telephone 14 by loading it with all the call credit remaining for the identified user during the specific time period for which updating is occurring. This is indicated by blocks 236 and 238.

Once cellular telephone 14 has been programmed, administrator station 22 updates the MaxCCAmount term in the user's record (i.e., updates the amount of money left in the user's account for this period) and writes CCAmt to cellular telephone 14 identifying the amount of money which was last unloaded from cellular telephone 14 when it was in use by the identified user. These steps are indicated by blocks 240 and 242.

All communications between administrator station 22 and cellular telephone 14 are governed according to a suitable communication protocol and command structure that enables administrator station 22 to read and write to the EEPROM and real time clock. This communication protocol and command structure enable communication between administrator station 22 and cellular telephone 14 remotely using DTMF communication. The DTMF characters are preferably of such a nature that they cannot be generated from a standard touch-tone telephone keyboard, thus inhibiting manual phone access. For example, the DTMF characters required may only be several milliseconds, or several hundred milliseconds in length, and spaced by several milliseconds, or several hundred milliseconds, so that the signals cannot be provided through manual entry by a touch-tone telephone keyboard.

In addition, all data transmitted preferably undergoes a cyclic redundancy code calculation to minimize any incidents of errors in transmission. Also, all commands are preferably initiated by administrator station 22, as opposed to cellular telephone 14. Once in the administrative data mode, control unit 38 in cellular telephone 14 disables microphone 54 and keyboard 58 to prevent interrupting DTMF communication. The keyboard and microphone are again enabled once cellular telephone 14 exits the administrative data mode. It will also be understood that a suitable handshaking protocol should be implemented.

An Embodiment of A User Interface

FIGS. 7A, 7B, 7C, 7D and 7E illustrate one embodiment of four different user interface screens used by administrator station 22. The interfaces facilitate input and revision of user profile information, call rate information and privilege information.

Figure 7A:
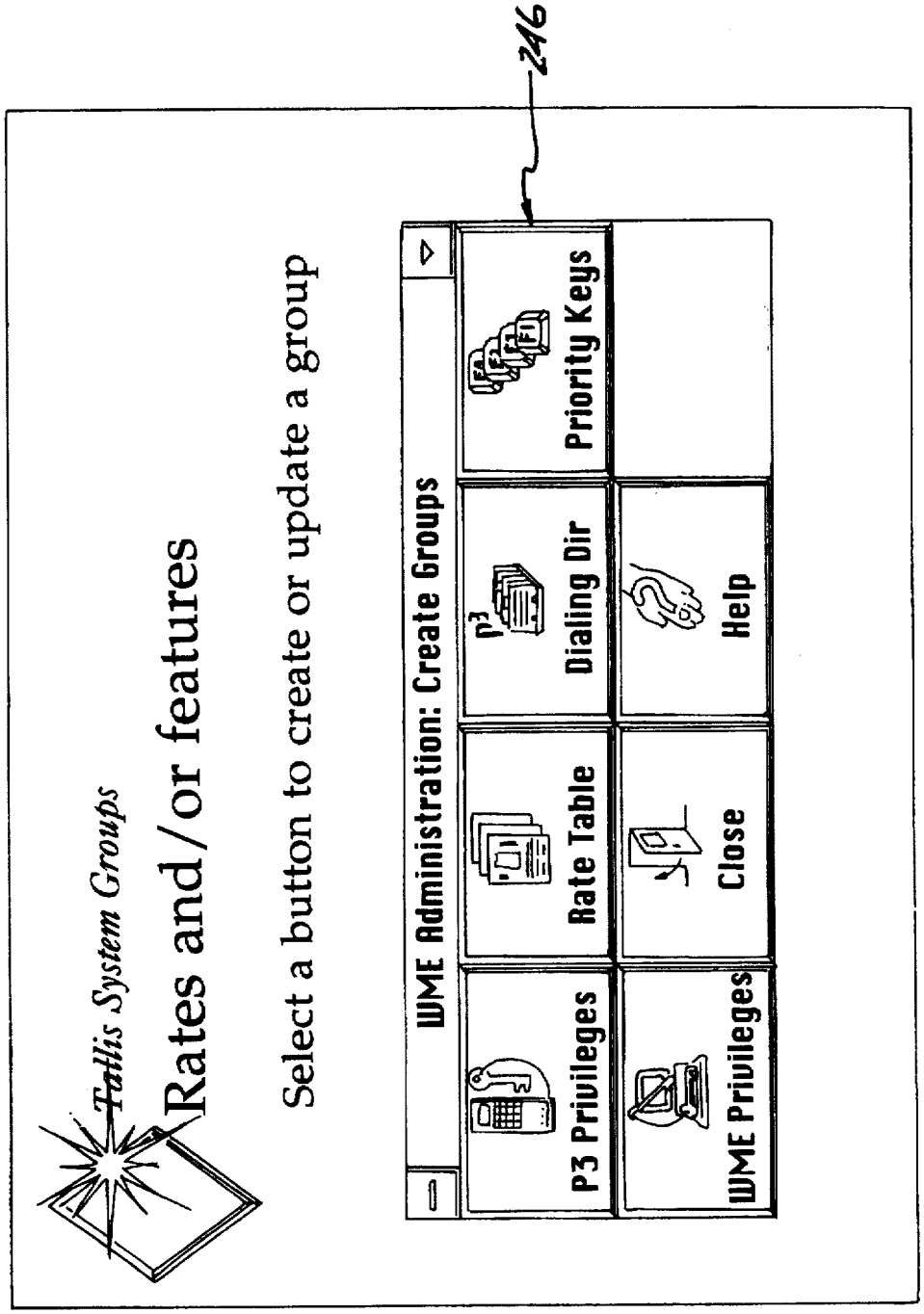

FIG. 7A is a typical user interface screen used as a tool bar for navigating among various functions performed by administrator station 22. FIG. 7A shows that control bar 246 includes seven buttons. The system operates in a well known, windows-type format, in which when the user places the cursor on one of the seven buttons and clicks a mouse or presses a key on a keyboard, the window corresponding to the particular button opens up to display additional information and allow additional operations to be engaged by the user. The Close and Help buttons are conventional buttons. The Close button closes the window currently displayed, and the Help button displays additional information which is designed to assist the user in navigating through the software.

The P3 Privileges button corresponds to an operation in which the user creates and modifies phone privilege groups. This is illustrated better in FIG. 7B. A Group Name field allows the user to create a new group by entering a group name. An arrow to the right of the Group Name field allows the user to scroll down group names already created.

A Privileges portion of the window is divided into the three tabbed cards. By clicking once on a tab, the associated card is brought to the fore front of the display.

The Keypad card allows the user to enable certain keypad functions for the displayed group. In a preferred embodiment, the Keypad card allows the user to enable or disable keypad dialing, the use of priority keys, and directory modifications. By clicking on any one of the options, the status of the option (enabled or disabled) toggles.

The Dialing card preferably allows the user to enable or disable a number of features. Those features include scratch pad dialing, manual telephone locking (which enables the user to lock the phone manually requiring an unlock code to operate the telephone), automatic locking (in which the telephone automatically locks itself each time it is powered off), seven digital dialing (local calls only), or eight digit dialing (local long distance calls).

The window shown also contains a miscellaneous or "Other" tabbed card. Typical functions which are selectable under this tabbed card include memory erase capability (allows the user to erase entries in the dialing directory and the scratch pad), incoming calls enabling (allows the user to receive calls), pager mode enabling (allows the user to place the telephone in pager mode to act as a pager), and shut down at zero dollars (disables the phone when the credit amount issued reaches zero).

Any other number of tabbed cards and functions can be provided in the Privileges window. The various privileges selected for each group name are saved so that groups need not be recreated with each use.

Figure 7B:
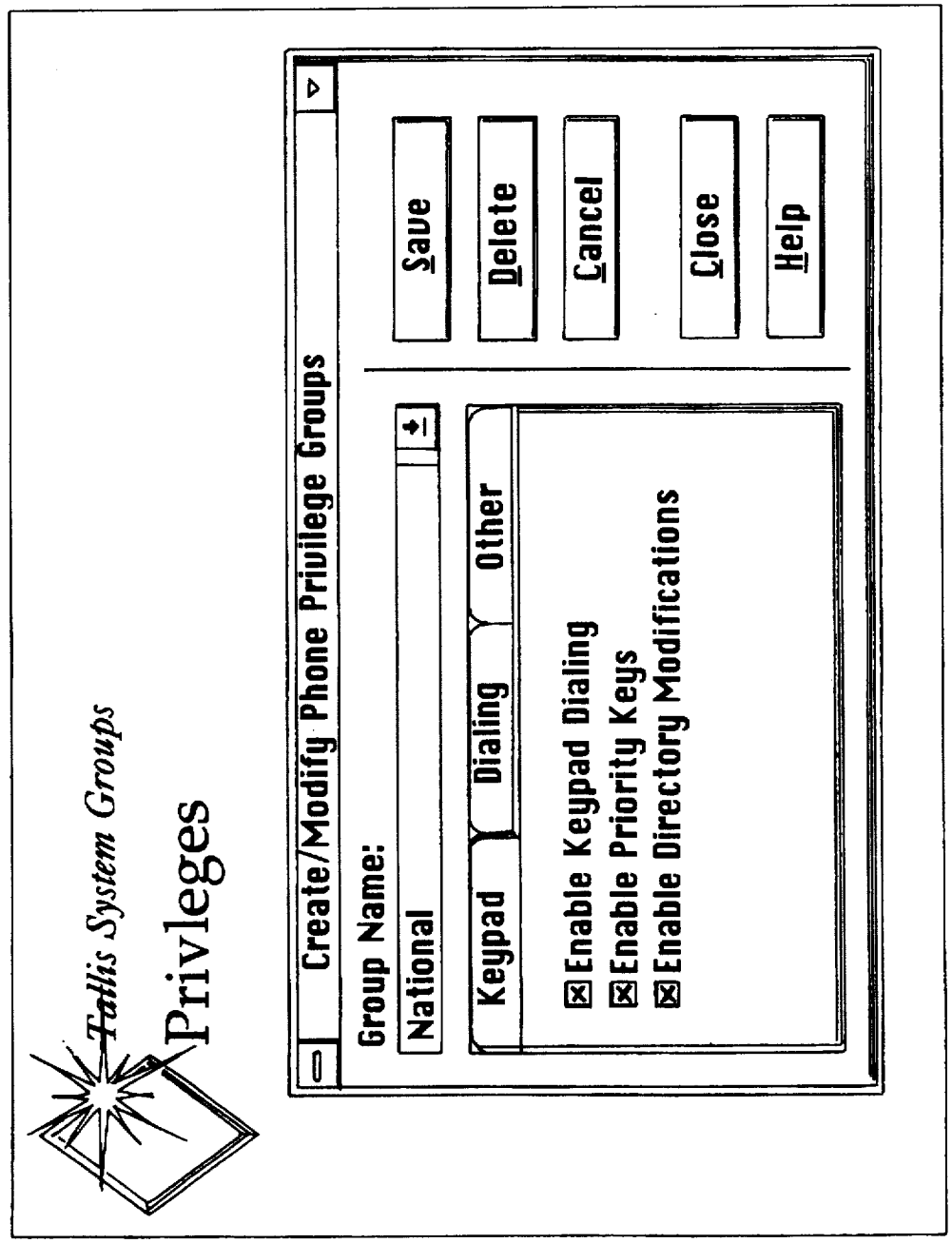
Figure 7C:

FIG. 7C illustrates one embodiment of a window corresponding to the Rate Table button on the tool bar 246 in FIG. 7A. The rate table window allows a user to create and modify rate tables which may change for various service carriers used. A rate table name field is provided so that the user can enter descriptive names of new rate tables. As with the window in FIG. 7B, if the user clicks on the arrow to the right of the rate table name field, the user can scroll down already existing rate tables.

Also, as with the window in FIG. 7B, the window in FIG. 7C is divided into three tabbed cards. The first tabbed card (the Air Time rate card) allows the user to set a number of air time rates, such as rates for peak time and off-peak time. This card also allows the user to set the hour upon which peak time starts and the hour upon which off-peak time starts.

The next tabbed card (the Long Distance rate card) allows the user to set long distance carrier rates, local long distance rates and various time periods for increased or decreased long distance and local long distance rates.

The Roaming rate tabbed card allows the user to set the roaming rate for both off-peak and peak times. This tabbed card also allows the user to set daily roam charges or other fees which may be charged for roaming telephone calls.

The Billing tabbed card preferably allows the user to set a time interval, below which the call will not be charged. A typical time interval is nineteen seconds. This card also allows the user to set the billing interval which determines when time is billed within a single call. Also, this card allows the user to set a fee for operator assisted calls.

The Rental Charges card allows the user to set various rental charges which may accrue for any particular telephone user. Finally, the Taxes tabbed card allows the user to set applicable taxes which will be charged.

FIG. 7D illustrates a typical operator interface which corresponds to the Dialing Directors button on tool bar 246 in FIG. 7A. The display in FIG. 7D includes a dialing directory name field within which the user enters a descriptive name associated with any given dialing directory. As with the other displays in FIGS. 7B and 7C, the arrow to the right of the dialing directory name field allows the user to scroll through already existing dialing directories.

An entry number field is a system-assigned sequential number which increases with each directory entry.

A display tag field is a name, entered by the user, corresponding with each phone number in the directory. The phone number is the phone number associated with the name of the entity entered into the display tag field. The description field is provided for the user's convenience to further describe the entry in the dialing directory.

A Priority Keys display, which corresponds to the priority keys button on tool bar 246 in FIG. 7A is not shown but is highly similar to the dialing directories display in FIG. 7D. The only difference is that, instead of the entry number field, the priority key display is provided with a priority key number each of which is associated with a priority key on keyboard 58.

The WME privileges button allows the user of administrator station 22 to perform a number of data base operations. Such operations include adding or deleting phones 14 from an active phone list in administrator station 22, and generating reports.

Figure 7E:
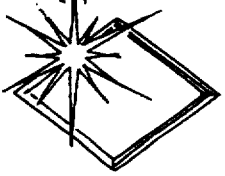

FIG. 7E illustrates one display of a user interface designed to allow the user of administrator station 22 to create and modify customer information. An upper portion of the display in FIG. 7E includes data fields for the name, address and telephone number of the company or other customer. Other information can also be included, such as a credit card name and account number, a driver's license number, a call credit amount, or other operator profile information which may be desirable.

A lower portion of the display in FIG. 7E displays the various privileges and other set-up information which is enabled for the particular customer displayed. An arrow to the right of each field allows the user of administrator station 22 to scroll through the various privileges, rate tables, dialing directories, and priority key assignments assigned or enabled for each customer identified.

Conclusion

The present invention provides a cellular telephone system which has significant advantages over prior systems. The present invention provides a system in which costs can proactively be controlled. In other words, cellular telephone 14 can be programmed with a maximum call credit, and control unit 38 controls operation of the cellular telephone based on the call credit. The cellular telephone 14 can be completely disabled upon reaching the call credit, or it can allow additional calls or only emergency telephone calls. Additional call credit can also be programmed into the cellular telephone 14 via the cellular network. Thus, cellular telephone 14 can be remotely programmed by administrator station 22. This remote link can be established even if the call credit has been depleted. This allows the user of the cellular phone 14 to add call credit at any time. Further, administrator station 22 proactively and automatically is capable of updating the call credit amount in cellular telephone 14 on a periodic basis.

The present invention also provides proactive dialing restrictions. A preset dialing directory can be loaded into memory 50 of cellular telephone 14 based on a given user's profile. In other words, dialing restrictions can be placed on a person-by-person basis. If the cellular telephone system of the present invention is used in a rental context, the dialing restrictions can be changed either remotely, or as cellular telephone 14 is issued to a new renter.

In addition, different levels of communication privileges can be provided to different users. In other words, if someone in a manager's role is provided with a cellular telephone 14, it may be desirable to provide the manager with modification privileges so that the manager can modify the calling directories and call credit amounts in the telephone 14. However, it may not be desirable to allow certain employees to modify anything in cellular telephone 14. These modification privileges can be proactively controlled on a continuous and on-going basis. In sum, the present invention provides proactive qualitative and quantitative control of cellular communications. In other words, the person assigning cellular telephones can use administrator station 22 to control both what numbers are called, and how much money or call credit can be expended on calls.

In addition, the present invention provides real time call detail reporting. All desired rates can be programmed into a rate table in cellular telephone 14. In fact, different rate tables can be used for different users. This can be programmed by administrator station 22 either remotely, or when a phone is issued to a certain user. Call detail reports can be developed within seconds, either when the user turns in the telephone 14, or remotely through administrator station 22. The administrator station 22 simply needs to download the call detail information from memory 50 in cellular telephone 14.

Therefore, it can be seen that the system according to the present invention can be used in a multitude of areas in which prior cellular telephones were incapable of operating, or at least incapable of operating with a high degree of efficiency. For example, some government employees which travel extensively require constant communication capabilities. The present system addresses these concerns while restricting usage to control spending of public funds. In addition, delivery companies can restrict usage by allowing access to only those phone numbers necessary for business use. For example, priority keys or function keys on keypad 58 can be programmed with an emergency number plus pertinent company locations. The dialing directory can also be preset with the phone numbers of specific customers to be visited within a weeks time.

The present invention is also well suited to the auto rental market. Administrator station 22 is suitable for containing a data base of user profile information for a large number of renters or clients. This is downloaded as the client obtains the phone from the rental entity. The present cellular telephone system is suitable for tracking all calls made, by telephone number, for summarizing call detail information at the rental counter literally in seconds. The renter receives an accurate, detailed record of all calls made including roam charges and long distance and local charges. The rental company is assured that all charges are accounted for and the renter has been properly charged. This significantly reduces the chance that the rental company will obtain bad debts for rental telephone bills.

It can also be seen that the present invention can be used in the professional market. In other words, the present invention offers the ability to enter a client account number along with the telephone number which assures accurate billing for persons such as consultants, attorneys, or certified public accountants, which bill telephone communications back to clients. A personal identification number is entered into the cellular telephone upon completing of a call, if so programmed. The call detail report shows the professional person which identification number was entered corresponding to each call, thus allowing the professional person to bill clients on a timely basis rather than waiting for monthly cellular bills.

Further, the present invention provides certain user productivity information. It allows a manager to directly review, or monitor remotely, which particular employees are making which particular calls. This can be reflective of productivity in certain instances and can be used to optimize performance.

The present invention also allows phone pooling. In other words, for a company to issue cellular telephones to its employees, it need only have the number of cellular telephones which corresponds to the number of employees working at any one time. Thus, in companies such as in delivery services where employees work in shifts, the company need only have enough cellular telephones to cover one shift. These cellular telephones can be reprogrammed and immediately reassigned each shift, based on a user profile data base stored in administrator station 22, thus allowing a significant savings to the company while providing the advantages, flexibility and adaptability which accompanies cellular communication technology.

The present system is also well suited for use by children. In other words, cellular telephone 14 can be programmed with only parent's home or work number, as well as emergency telephone numbers, and can then be provided to a child. In this way, the child has constant communication access to his or her parents home and work numbers, as well as emergency telephone numbers, but cannot incur a high cellular communication bill by calling friends or other acquaintances.

The present invention is also preferably accompanied by any suitable encryption technique so that additional call credit cannot be programmed into cellular telephone 14 without being properly encrypted using appropriate security formats.

Although the present invention has been described with reference to preferred embodiments, workers skilled in the art will recognize that changes may be made in form and detail without departing from the spirit and scope of the invention.

What is claimed is:

1. A cellular telephone system, comprising: a cellular telephone including:

a receiver for receiving cellular communications;

a transmitter for transmitting cellular communications;

an operator interface for receiving input commands from an operator and for providing command signals based on the input commands; and a controller, coupled to the receiver, the transmitter and the operator interface, for controlling the receiver and the transmitter based on the command signals, the controller including:

a memory for storing predetermined dialing directory data indicative of allowed telephone numbers useable by the operator;

restriction means for restricting communications with unauthorized telephonic communicators corresponding to telephone numbers other than the allowed telephone numbers; and an administrator station having a second controller for communicating with the controller in the cellular telephone, wherein the controller in the cellular telephone includes an input, coupled to the receiver, for receiving the dialing directory data remotely from the administrator station.

2. The cellular telephone system of claim 1 wherein the restriction means comprises:

disabling means for precluding communication to the unauthorized telephonic communicators.

3. The cellular telephone system of claim 1 wherein the restriction means comprises:

disabling means for precluding communication from the unauthorized telephonic communicators.

4. The cellular telephone system of claim 1 wherein the administrator station includes a second memory for storing user profile information, and wherein the second controller communicates the user profile information to the controller in the cellular telephone, and wherein the controller in the cellular telephone controls operation of the cellular telephone based on the profile information received from the second controller.

5. The cellular telephone system of claim 4 wherein the user profile information includes call credit information indicative of a currency threshold which an operator of the cellular telephone is allowed to incur due to cellular communications.

6. The cellular telephone system of claim 5 wherein the controller in the cellular telephone includes means for determining an amount of currency to be charged for the cellular communications based on the user profile information.

7. The cellular telephone system of claim 6 wherein the controller restricts operation of the cellular telephone when the amount to be charged for the cellular communication reaches the call credit amount.

* * * * *